March 9, 1971          E. J. LAWTON          3,568,311

INSULATING AND SPACING ELECTRICALLY CONDUCTIVE MEMBERS

Original Filed April 1, 1966

INVENTOR:
Elliot J. Lawton,
by
His Attorney

United States Patent Office 3,568,311
Patented Mar. 9, 1971

3,568,311
INSULATING AND SPACING ELECTRICALLY CONDUCTIVE MEMBERS
Elliott J. Lawton, Cleverdale, N.Y., assignor to General Electric Company
Original application Apr. 1, 1966, Ser. No. 539,487. Divided and this application Sept. 30, 1968, Ser. No. 763,852
Int. Cl. H01b 7/00
U.S. Cl. 29—624                                 2 Claims

ABSTRACT OF THE DISCLOSURE

Means for the support of each of a plurality of spaced electrically conductive members in spaced, insulated relationship in an electrical apparatus is described. An elongated member of insulating material is employed passing through aligned apertures in the conductive members with portions of the insulating member between conductive members being expanded. The expanded portions cooperate either with each other or with an end support to firmly hold the conductive members in fixed spaced relationship.

---

Figure 1:
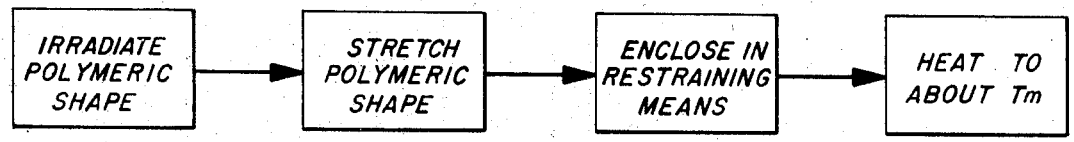

This application is a division of United States patent application S.N. 539,487—Lawton, now abandoned filed Apr. 1, 1966, and assigned to the assignee of the instant application.

This invention is concerned with the support, spacing and insulation of conductive members in an electrical assembly. The specific element employed herein is made of an organic polymer member responsive to the application of heat such that, when the temperature thereof is raised above a threshold temperature, the member expands to a degree far in excess of the thermal expansion thereof, until opposed by a resisting member or until it reaches a relaxed state of expansion.

The organic polymer member for use in this invention is made of a glassy or crystalline polymer having the property, after having been deformed, to "remember" the pre-deformation configuration, which member when heated to a temperature near or above the crystal melting temperature of the particular polymer will expand, if unrestrained, to an extent far in excess of the expansion due to thermal expansion.

Various terms and abbreviations used in this specification are important to a complete understanding of phenomena embodied in this invention and are defined as follows:

(a) $T_g$—the temperature at which a glassy polymer starts to soften appreciably;
(b) $T_m$—the crystal melting temperature of a crystalline polymer;
(c) Form stability—the capacity of a material to retain its shape without support at temperatures in excess of $T_g$ and $T_m$ of glassy and crystalline polymers, respectively.

The most commonly employed units for measuring high energy radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "rep.") is a convenient unit which usually describes the radiation dose from other than gamma or X-rays, and is the measure of the ionization in the absorbing tissue. The ionization produced by primary radiation is expressed as one rep. when the energy lost in tissue is equivalent to the energy lost by the absorption of one Roentgen of gamma or X-rays in air. Further definitions of "Roentgen" and "rep." can be found on page 256 of "The Science and Engineering of Nuclear Power." edited by Clark Goodman (1947) and on page 436 of "Nuclear Radiation Physics," by Lapp and Andrews (1948). For convenience, the term "Roentgen equivalent physical" or "rep." or "mega-rep." ($10^6$ rep.) will be used in this application.

In general, the energy of the irradiation advantageously employed in the practice of this invention may range from about 50,000 to 20 million electron volts or higher depending upon materials. Although high energy electron irradiation is preferred since it produces a large amount of easily controllable, less costly, high energy ionizing radiation within a short period of time without rendering the product radioactive, many other sources of high energy ionizing radiation can also be used in this invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; fast or slow neutrons or the mixed neutron and gamma radiation, such as is present in certain atomic reactors; X-rays; and other miscellaneous sources, such as protons, deuterons, α-particles, fission fragments, such as are available from cyclotrons, etc. High energy electron sources can be any convenient source such as the high energy electron source disclosed in U.S. Pat. 2,992,927, the betatron, other miscellaneous sources such as a Van de Graaff generator, etc.

A structural element for functioning in the manner required for this invention may be prepared by (a) axially orienting an appropriate irradiation crosslinked polymeric cylindrical body at slightly elevated temperature by stretching the cylindrical body and (b) cooling the cylindrical body to ambient temperatures. Thereafter, the cylindrical polymeric body may be incorporated into an electrical assembly by (a) passing the body through aligned apertures in the spaced conductive elements thereof, (b) heating the oriented cylindrical body to raise its temperature to a value at least as high as within a few degrees below the crystal melting temperature thereof ($T_m$ will, of course, be different for different materials, for example, the value of $T_m$ for low density polyethylene is about 105° C., while for high density polyethylene the value of $T_m$ is about 136° C.), and (c) cooling the electrical assembly. When the temperature approaches or exceeds $T_m$ the forces orienting the polymeric cylindrical body are released thereby allowing the cylindrical body to try to return to its original shape and size. The portions of the body passing through the apertures will expand until stopped by the inner surfaces of the apertures while the portions of the body to either side of each conductive member will expand beyond the extent of the apertures.

Figure 2:
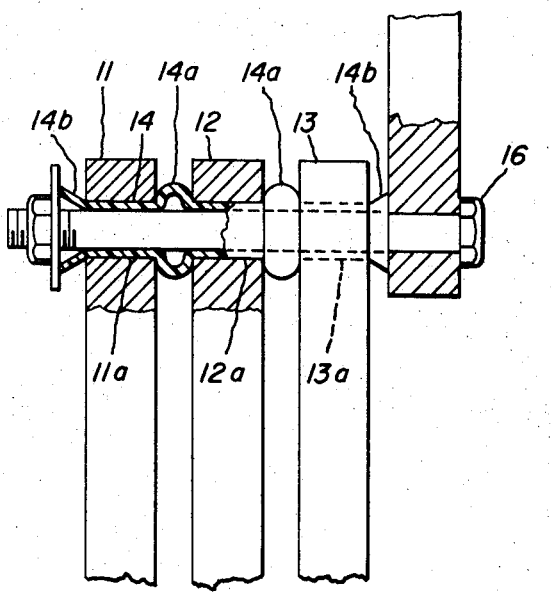

The exact nature of this invention as well as other objects and advantages thereof will be readily apparent from consideration of the following specification relating to the annexed drawings in which:

FIG. 1 is a flow diagram of the process for the preparation of a structure embodying a polymer shape in accordance with this invention; and FIG. 2 is a schematic representation of the use of a tube prepared in accordance with this invention to simultaneously space, insulate, and mechanically support electrically conductive members.

The general mode of preparation of a structure from a polymer shape, e.g. a space-defining envelope, having the capacity, upon the heating thereof to within about 10° C. of $T_m$ (in the case of a crystalline polymer), to expand significantly without further heating is shown by the flow diagram in FIG. 1. First, the polymer shape is crosslinked, as by irradiation, in order to provide form stability for the polymer shape above $T_m$ (crystalline polymer) or $T_g$ (glassy polymer). The dosage should be at least 2 mega-reps. and may be as great as 50 mega-reps. Next, the shape is axially oriented by stretching to increase the length thereof, the stretching generally being accomplished at slightly elevated temperatures. In the case of polyethylene, the stretching should be conducted at a temperature in the range of from about 55–75° C. Preferably, the initial increase in length upon stretching should be in the range of from about 20 percent to about 120 percent of the starting length. However, to achieve particular behavior of the polymer shape upon expansion thereof, the range may vary between about 10 percent and about 200 percent of the starting length. Thereafter, if it has been heated during the stretching operation, the polymer shape is allowed to cool to ambient temperature (usually room temperature, i.e. about 20–30° C.), while being held in the stretched state. During the stretching operation, the outside dimension (and the wall thickness in the case of a cylinder such as tube 11 in FIG. 2) is reduced until the desired external dimensions for the polymer shape to enable fitting thereof within the apertures in the conductive members with some preselected clearance is achieved.

Many polymers, which exhibit the "memory" phenomenon may be used in the practice of this invention and although solid polyethylene is preferred, other polymers may also be used in the process of this invention, as for example: solid polypropylene; solid copolymers of ethylene with an olefin having 3 to 5 carbon atoms as for example, propylene; polyoxymethylene; polyvinylidene chloride; copolymers of ethylene or other materials having vinyl groupings with materials such as ethyl acrylate or other acrylates; polyethylene terephthalate; polymethylene; copolymers of ethylene with acetylene; graft copolymers of polyethylene with an olefin having 3 to 5 carbon atoms, as for example, propylene. Other materials listed in U.S. Pat. No. 3,022,543—Baird, Jr. et al., and which are used to produce polymer film having improved shrink energy exhibit the "memory" phenomenon and are included in the scope of this invention.

In the case of the ethylene-ethyl acrylate copolymer, $T_m$ would be about 95° C. and a temperature in the range of from about 45° C. to about 55° C. should be applied during the stretching of the irradiated polymer shape.

Determining the wall thickness of the polymer shape depends upon the rigidity of the particular polymer and, in general, the requisite minimum wall thickness can be said to be that thickness which will enable the polymer shape to retain its structural integrity before, during and after heating. The maximum wall thickness will depend upon the type of radiation employed in order to insure requisite cross-linking to achieve form stability above $T_m$ (or $T_g$). As an example, for a 1" (inside diameter) polyethylene tube, the wall thickness could vary from about 0.005" to about ⅛". For smaller diameter tubes, the minimum thickness could be reduced, while for larger diameter tubes, the minimum wall thickness would be increased.

Heating to trigger the release of the expansion forces can be accomplished by heating the entire electrical assembly or by heating the polymer shape in place without significantly heating the restraining means, as by blowing hot air down through the interior of the polymer shape. Specialized heaters can, of course, be designed for this particular application.

Voltages required for the irradiation cross-linking will be known to those skilled in the art with the practical voltage in a given situation probably being in the range of from 200,000 to 10 million electron volts.

The minimum molecular weight of the polymer selected for the practice of this invention will vary with the polymer. In the case of polyethylene, the lower practical limit for molecular weight would be a value of about 10,000 viscosity molecular weight.

Additional support can be given to thin walled tubes, if desired, during the expand step by the use of sufficient internal air pressure to prevent distortion of the tube during expansion thereof as in the forming of a protective liner within a rigid tube capable of restraining the expansive force.

The difference between the diameter of the apertures in the conductive members and the outside diameter of the completely relaxed expand tube should be between about 15 percent and 50 percent of the outside diameter of the expand tube depending on the magnitude of the tube diameter, tube wall thickness and polymeric material being employed.

It has been found that if the aforementioned diameter differential is significantly greater than 50 percent, the expand tube, upon being heated, will be tightly held in the restrained portions but the unsupported ends of the tube may buckle and fold inwardly due to the excessive outward-action force of expansion. This behavior is pronounced if the strength of the tube wall is too low. These end effects depend upon the extent of difference between the relaxed diameter of the expand tube liner and the internal dimensions of the apertures and the degree of radiation crosslinking, or stiffness, of the tube liner. Thus, with a large difference existing between the relaxed diameter of the liner and the diameter of the apertures, for example, different behavior may be observed upon expansion between liners irradiated with 10 mega-r. and elongated by 50%, on the one hand, and liners irradiated with 5 mega-r. and elongated by 50%, on the other. In the former case the ends will turn in toward the center slightly during the expansion, while in the latter case, having the much weaker crosslinked network, the ends appear to be flared. The extent and nature of such behavior with a given polymer material is readily ascertained by routine tests in accordance with the teachings of this invention.

This invention is employed to provide insulating mechanical support for a multiple number of spaced plates (e.g. electrical bus bars) as shown in FIG. 2. This construction may be produced by properly arranging plates 11 12, 13 (or a greater number, if necessary) spaced relative to each other. Next, the requisite length of expand tube 14 is threaded through in-line holes 11a, 12a, 13a in the plates 11, 12, 13. The desired spacing of these plates must, of course, be maintained during the assembly and expanding operations. Upon heating the aforedescribed assembly to a temperature at least within 10° C. of $T_m$ a configuration substantially as illustrated in FIG. 2 will result. As shown, the plates 11, 12, 13 are set in definite spaced alignment being held by ridged formations 14a and flanges 14b. The generation of ridge formation extending between the plates occurs, of course, when the pre-deformation cross-sectional areas of the expand tube is greater than the area of the circle that can be inscribed in the given apertures provided through the plates. Thereafter a metal support (tie bolt 16) common to all three plates may be inserted therethrough and tightened with an appropriate fastener.

This method has the prime advantage over conventional arrangements for mounting and insulating multiple plates from each other and from the support bolt in that all of the functions of insulation and spacing as well as the locking of the plates in position are accomplished at one and the same time.

What I claim as new and desire to secure by Letters Patent of the United States is:

1. In preparing an electrical apparatus wherein a plurality of electrically conductive members are assembled in a predetermined fixed spaced relationship to each other the improvement comprising the steps of:
    (a) providing at least one aperture through each conductive member, (b) arranging each conducting member with one aperture thereof in alignment with one aperture of each of the other conducting members,
(c) inserting through the aligned apertures a cylindrically-shaped polymeric element deformed by being stretched longitudinally and contracted radially to substantially stable dimensions,
   (1) said polymeric element of stable dimensions having potentially releasable expand energy for return thereof to pre-deformation dimensions upon being heated above a threshold temperature, the pre-deformation cross-sectional area of said polymeric element being greater than the area of the circle that can be inscribed in each of said apertures and
(d) heating said element to a temperature at least as high as said threshold temperature to enable longitudinal shrinkage of said element and radial expansion thereof between adjacent spaced conductive members to maintain the spaced relationship thereof.

2. The improved process substantially as recited in claim 1 including the step of inserting a central support member through the expanded polymeric element.

References Cited
UNITED STATES PATENTS

| | | | |
|---|---|---|---|
| 2,172,927 | 9/1939 | Andeen | 174—138(.2)X |
| 3,013,643 | 12/1961 | Perry | 85—70X |
| 3,317,987 | 5/1967 | Drees | 174—138(.2)UX |

DARRELL L. CLAY, Primary Examiner

U.S. Cl. X.R.

29—447; 85—37; 174—68, 138; 264—230